(12) United States Patent
Lim et al.

(10) Patent No.: US 11,220,129 B2
(45) Date of Patent: Jan. 11, 2022

(54) DECORATION SHEET HAVING DISCONTINUOUS LENTICULAR LENS

(71) Applicant: SKC HI-TECH & MARKETING CO., LTD., Cheonan-si (KR)

(72) Inventors: Hee-Young Lim, Cheonan-si (KR);
Sang-Hyun Park, Seoul (KR);
Chang-Ho Kang, Cheonan-si (KR);
Seong Do Kim, Cheonan-si (KR);
Hyun Kyung Kwon, Cheonan-si (KR);
Hyung Joon Paik, Cheonan-si (KR)

(73) Assignee: SKC HI-TECH & MARKETING CO., LTD., Cheonan-si (KR)

( * ) Notice: Subject to any disclaimer, the term of this patent is extended or adjusted under 35 U.S.C. 154(b) by 0 days.

(21) Appl. No.: 16/475,158

(22) PCT Filed: Jan. 25, 2017

(86) PCT No.: PCT/KR2017/000900
§ 371 (c)(1),
(2) Date: Jul. 1, 2019

(87) PCT Pub. No.: WO2018/128213
PCT Pub. Date: Jul. 12, 2018

(65) Prior Publication Data
US 2019/0337325 A1    Nov. 7, 2019

(30) Foreign Application Priority Data

Jan. 3, 2017 (KR) .................. 10-2017-0000686

(51) Int. Cl.
*B44C 3/02* (2006.01)
*B44C 5/04* (2006.01)
(Continued)

(52) U.S. Cl.
CPC ............... *B44C 3/02* (2013.01); *B44C 5/04* (2013.01); *B44F 1/04* (2013.01); *B44F 1/045* (2013.01); *G02B 3/005* (2013.01)

(58) Field of Classification Search
None
See application file for complete search history.

(56) References Cited

U.S. PATENT DOCUMENTS 5,536,455 A * 7/1996 Aoyama ................. B29C 41/20
                                            264/1.7
5,924,870 A   7/1999 Brosh et al.
(Continued)

FOREIGN PATENT DOCUMENTS

CN    103728676 A    4/2014
JP        3087818 U    8/2002
(Continued)

OTHER PUBLICATIONS

Machine Translation of KR 10-2005-0048725.*
(Continued)

*Primary Examiner* — Laura C Powers
(74) *Attorney, Agent, or Firm* — Sughrue Mion, PLLC

(57) ABSTRACT

The present invention relates to a decoration sheet to be applied to an exterior material for electric home appliances or electronic devices. The decoration sheet includes a pattern layer having lenticular lenses arranged in multiple rows, wherein at least one of the multiple rows has one or more discontinuous lens sections in which the lenticular lens is not continuous, thereby reducing poor visibility and enhancing productivity; and the discontinuous lens sections can be arranged to implement a character, a pattern, or the like, thereby expressing a sense of pattern. Further, the decoration sheet has an adhesive layer formed on the other surface thereof and thus can function to prevent the scattering of a (Continued)

surface of glass or the like onto which the decoration sheet is attached.

12 Claims, 16 Drawing Sheets

(51) Int. Cl.
  *B44F 1/04*   (2006.01)
  *G02B 3/00*   (2006.01)

(56) References Cited

U.S. PATENT DOCUMENTS

| | | | |
|---|---|---|---|
| 6,084,713 A | 7/2000 | Rosenthal | |
| 6,381,071 B1 | 4/2002 | Dona et al. | |
| 7,290,803 B2 * | 11/2007 | Scarbrough | B44F 1/045 |
| | | | 283/91 |
| 2007/0104911 A1 | 5/2007 | Chiang et al. | |
| 2008/0019029 A1 | 1/2008 | Raymond et al. | |
| 2008/0160226 A1 * | 7/2008 | Kaule | B42D 25/425 |
| | | | 428/29 |
| 2013/0330486 A1 | 12/2013 | Shields | |
| 2016/0131805 A1 * | 5/2016 | Smith | A43B 1/0027 |
| | | | 359/621 |

FOREIGN PATENT DOCUMENTS

| | | |
|---|---|---|
| JP | 2004050840 A | 2/2004 |
| KR | 10-2005-0048725 A | 5/2005 |
| KR | 10-0896623 B1 | 5/2009 |
| KR | 10-2014-0066493 A | 6/2014 |
| KR | 10-2016-0103460 A | 9/2016 |

OTHER PUBLICATIONS

Machine Translation of CN103728676.*
International Search Report for PCT/KR2017/000900, dated Aug. 31, 2017.

* cited by examiner

[Fig. 1a]
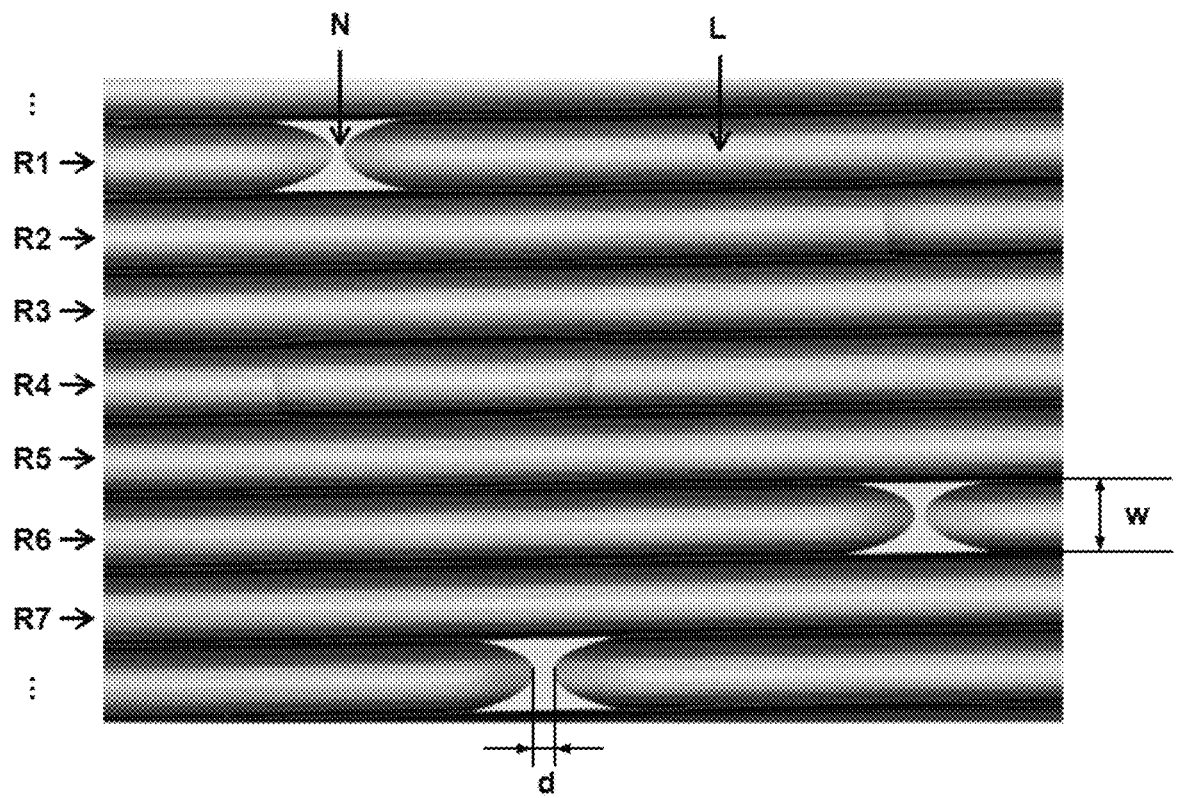
[Fig. 1b]
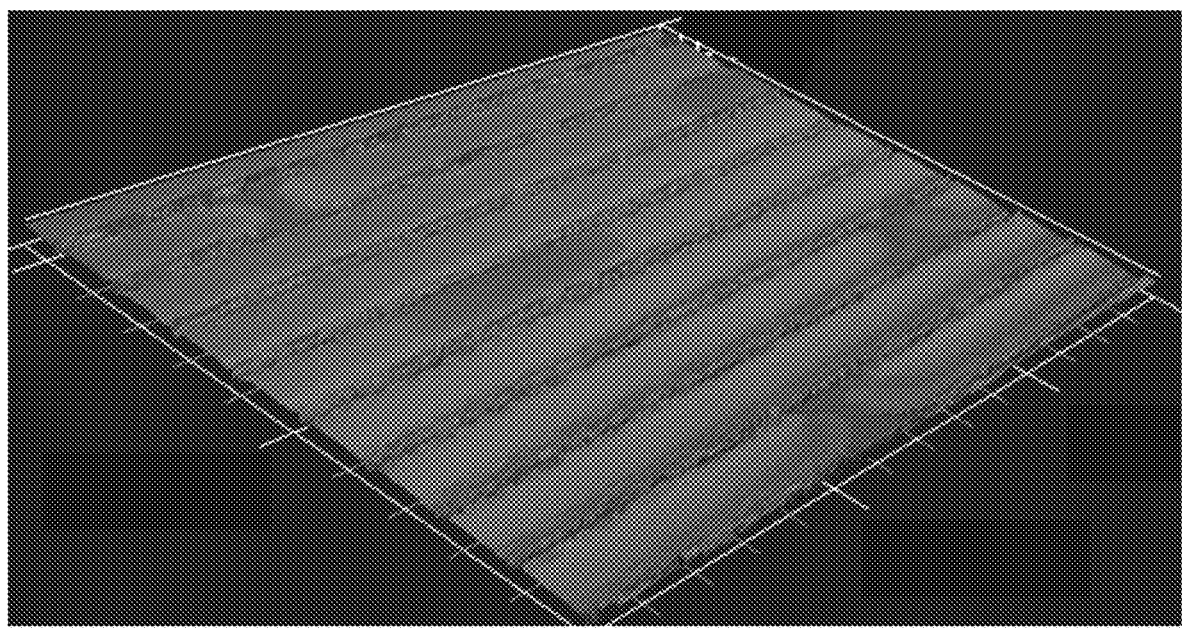

[Fig. 2a]
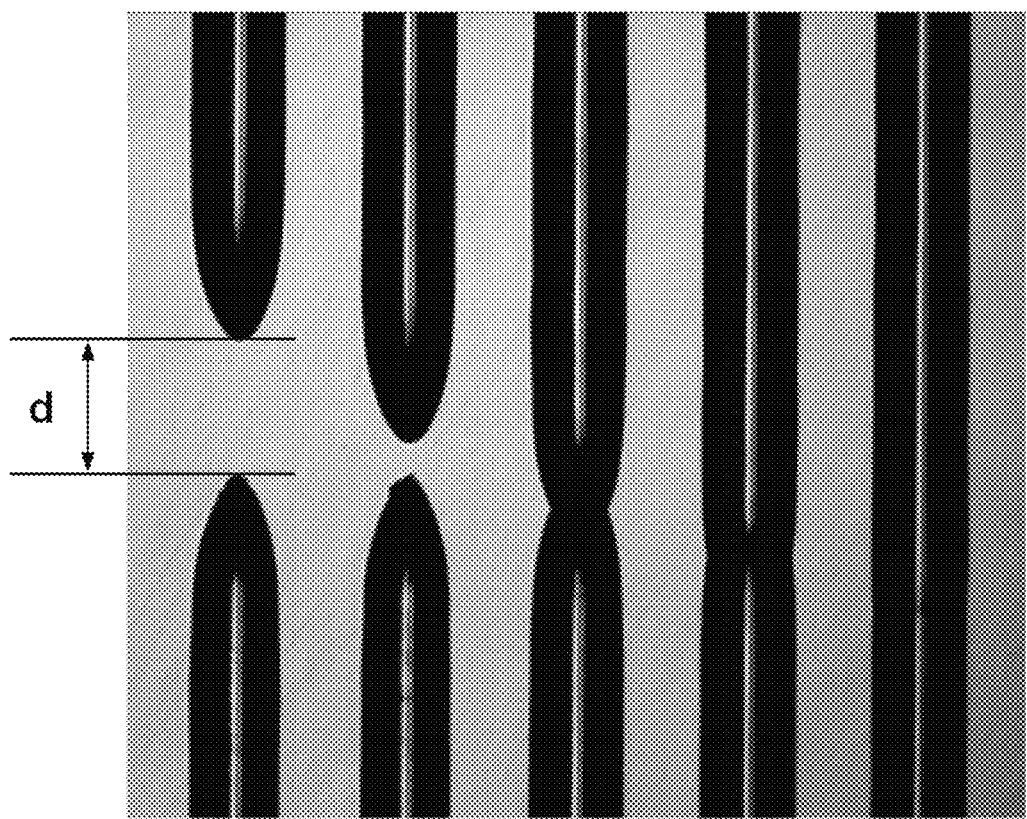
[Fig. 2b]
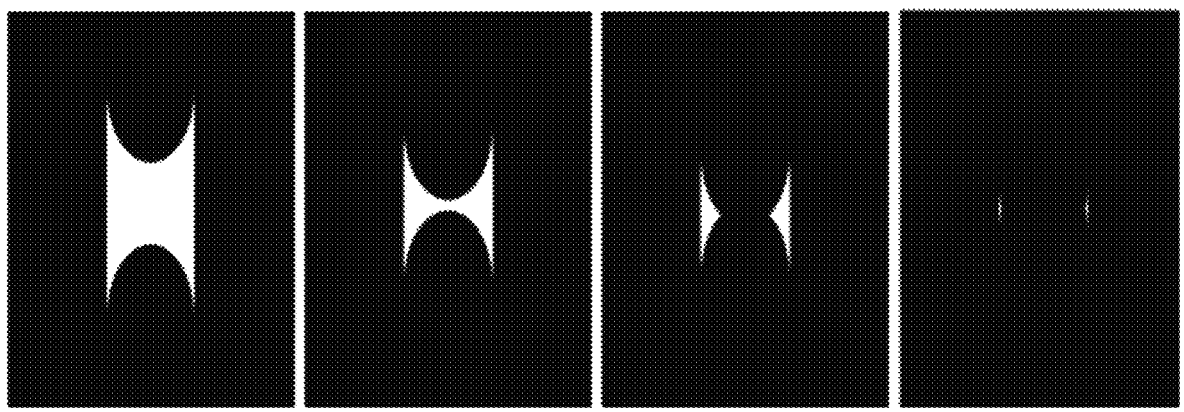

[Fig. 3a]
[Fig. 3b]

[Fig. 3c]
[Fig. 3d]
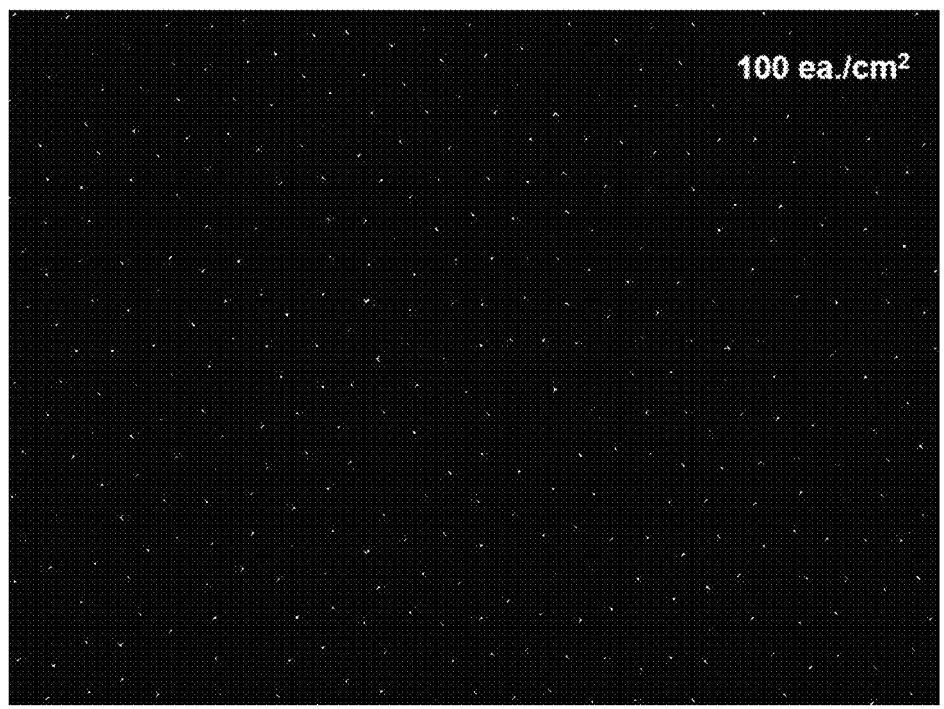

[Fig. 3e]
[Fig. 3f]
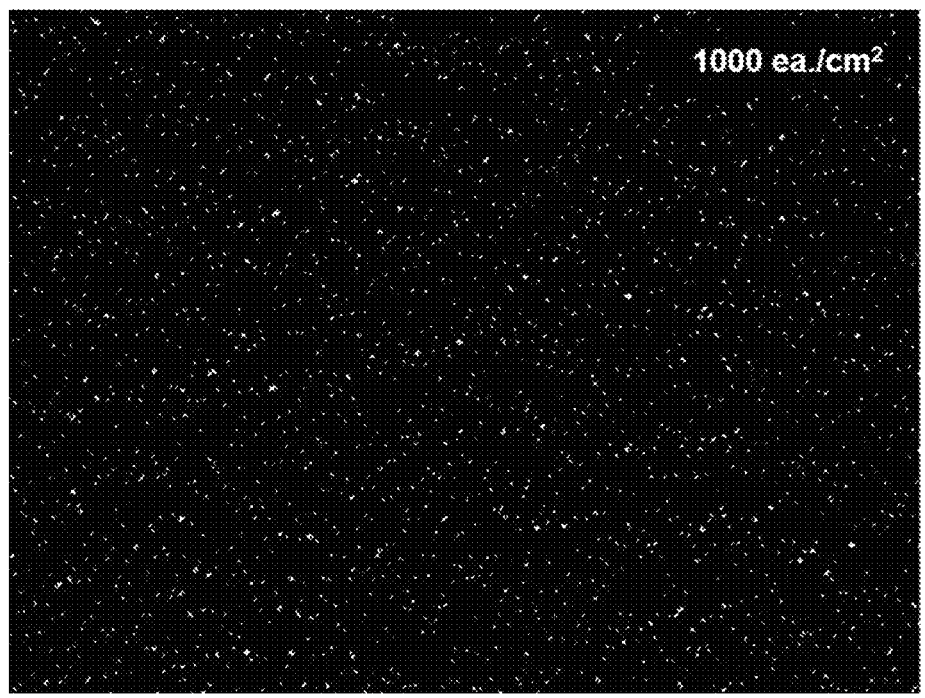

[Fig. 3g]
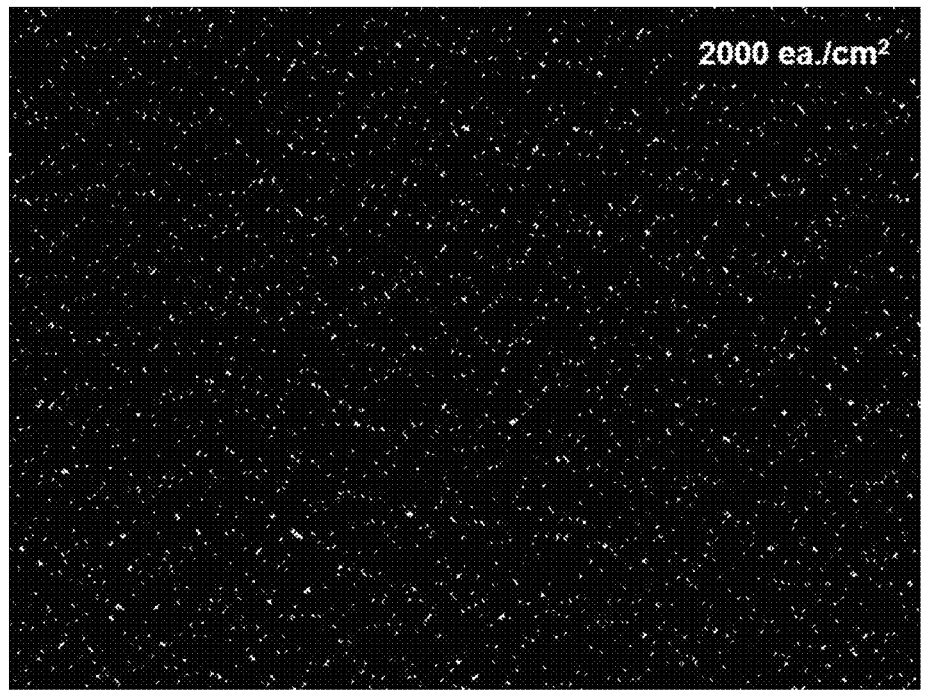
[Fig. 3h]
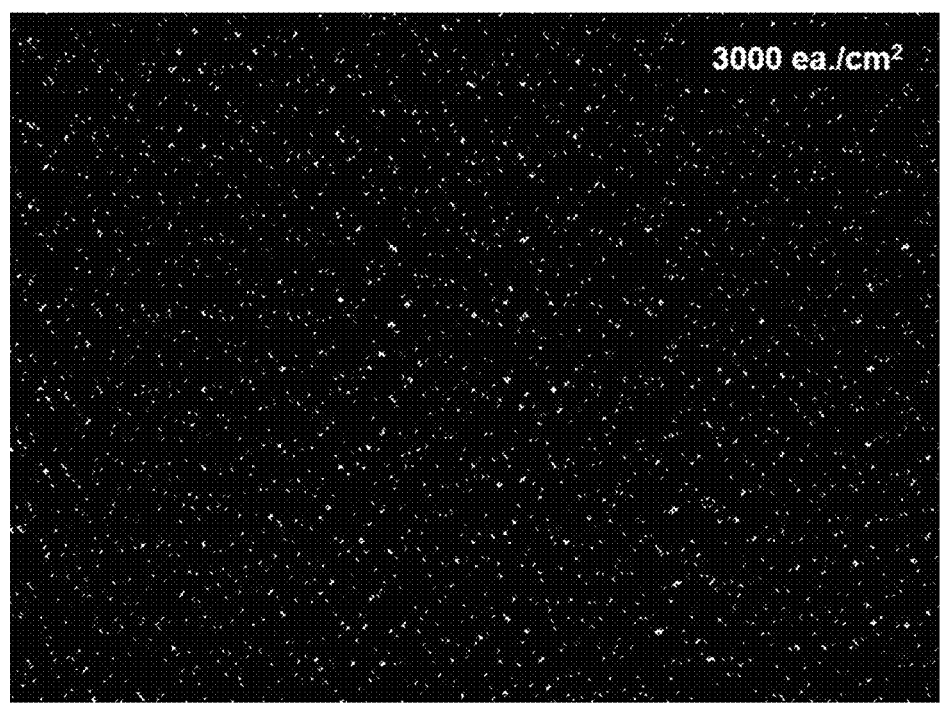

[Fig. 4a]
[Fig. 4b]
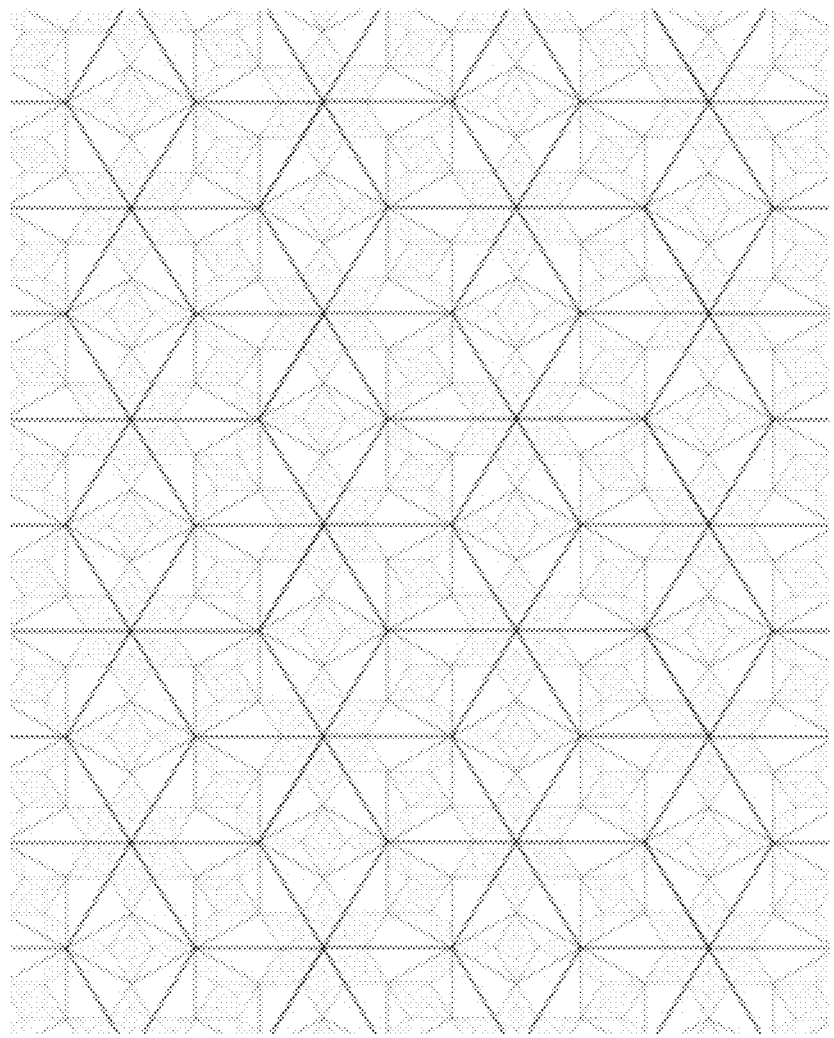

[Fig. 5]
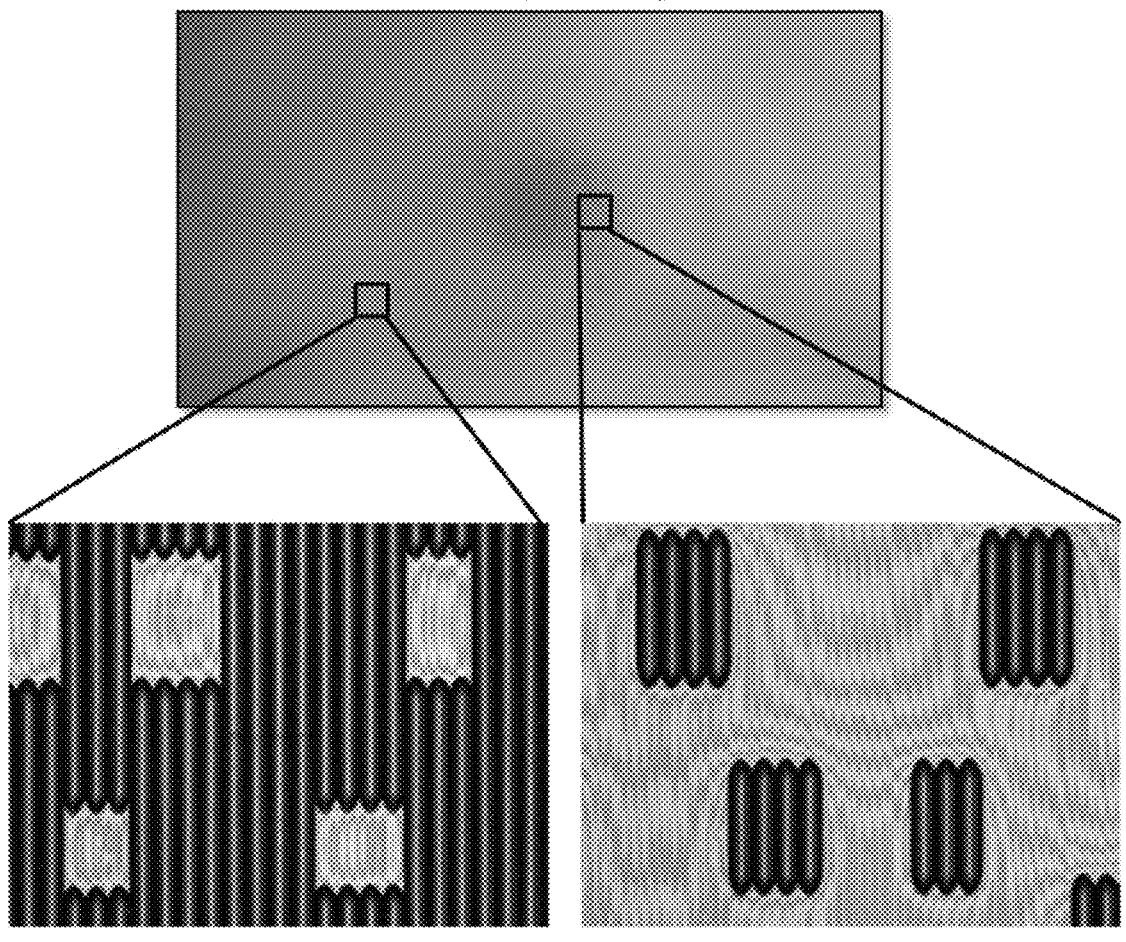

[Fig. 6a]
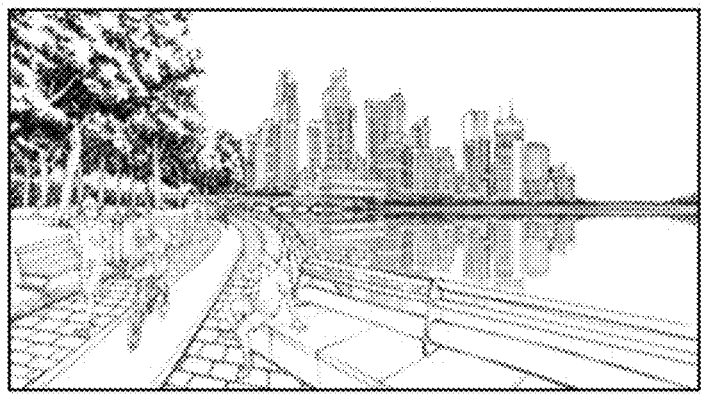
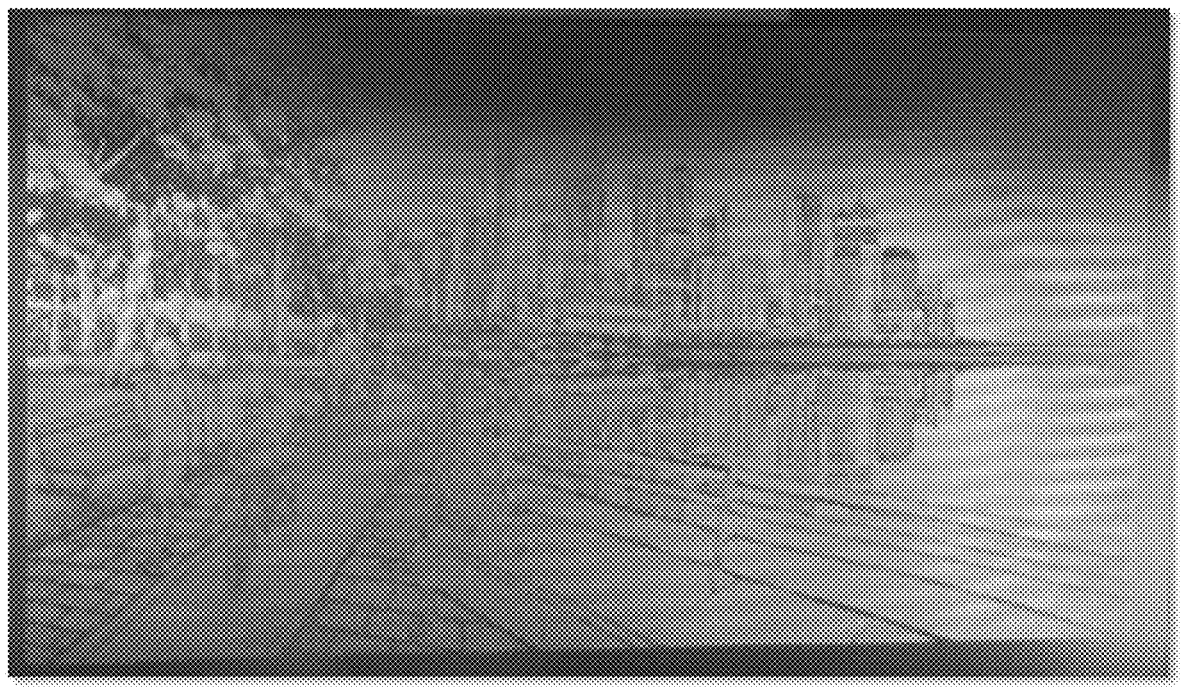

[Fig. 6b]
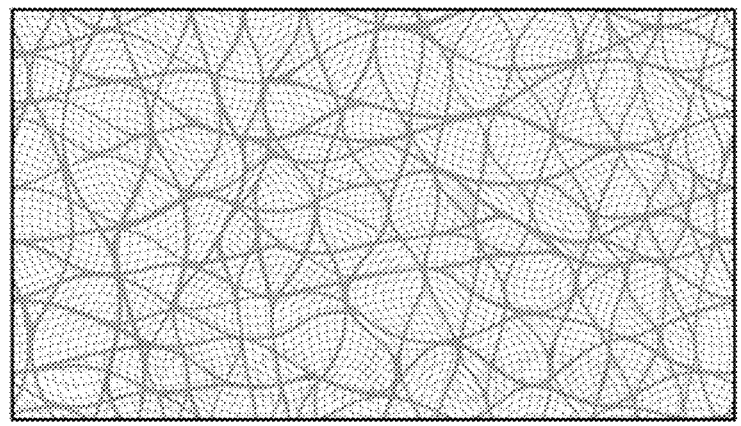
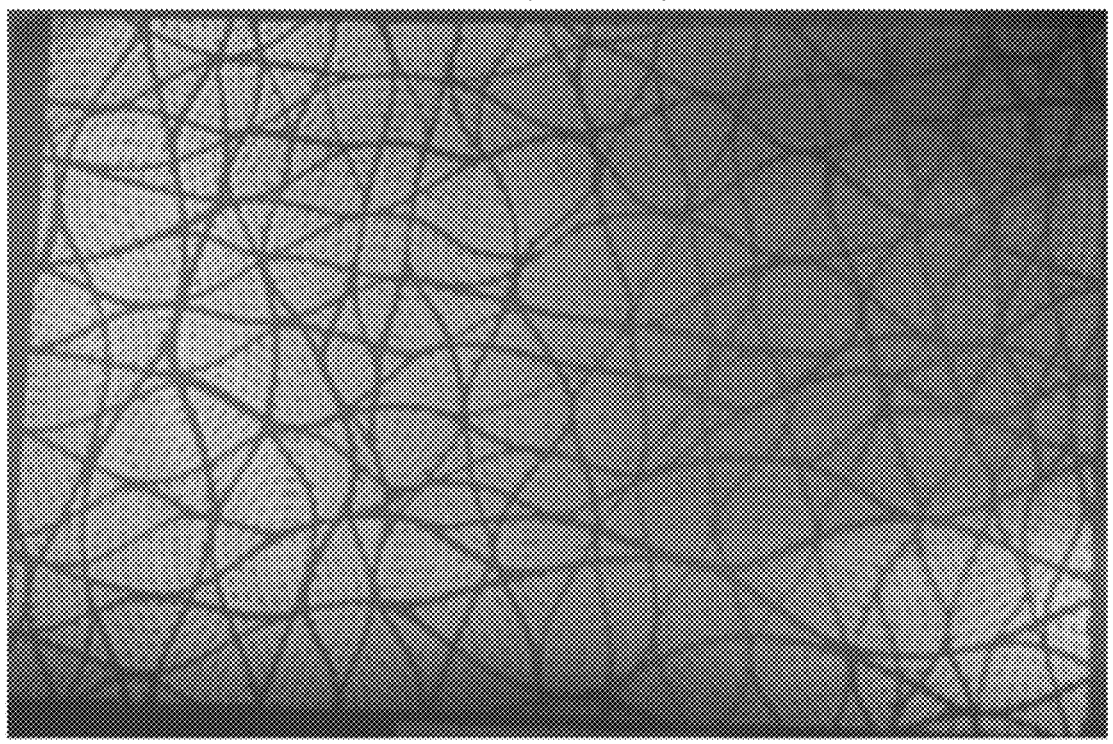

[Fig. 6c]
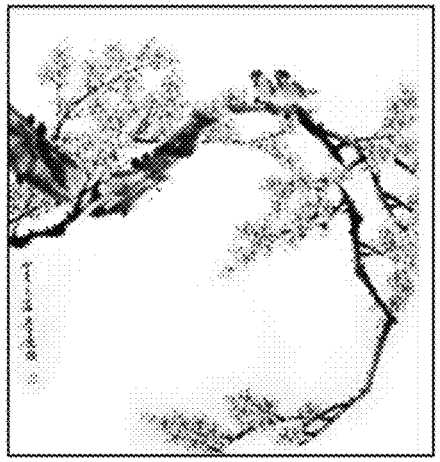
Designed image
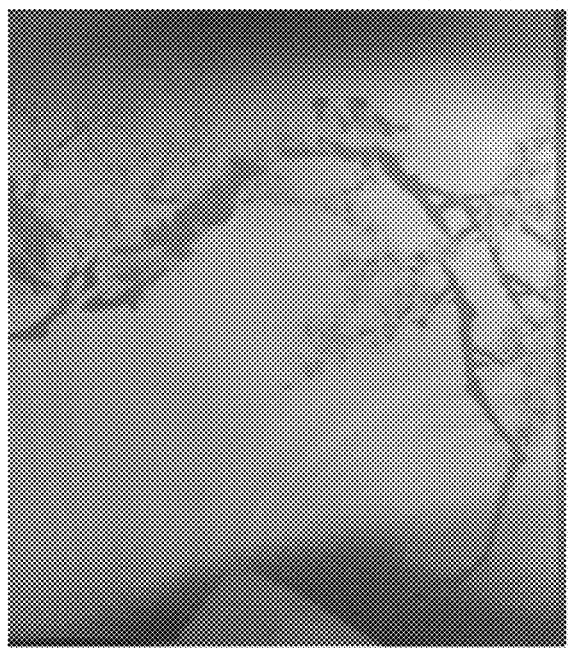
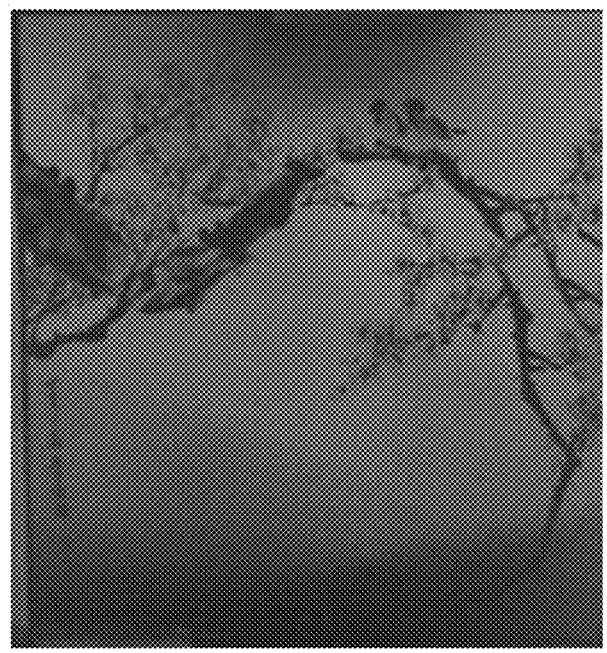
Fabricated pattern layer
Not colored          Colored in blue color

[Fig. 7]
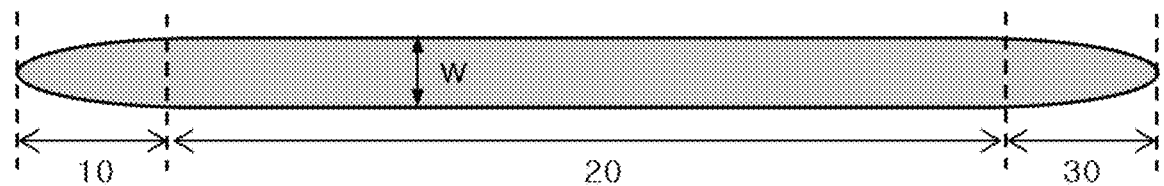
[Fig. 8]
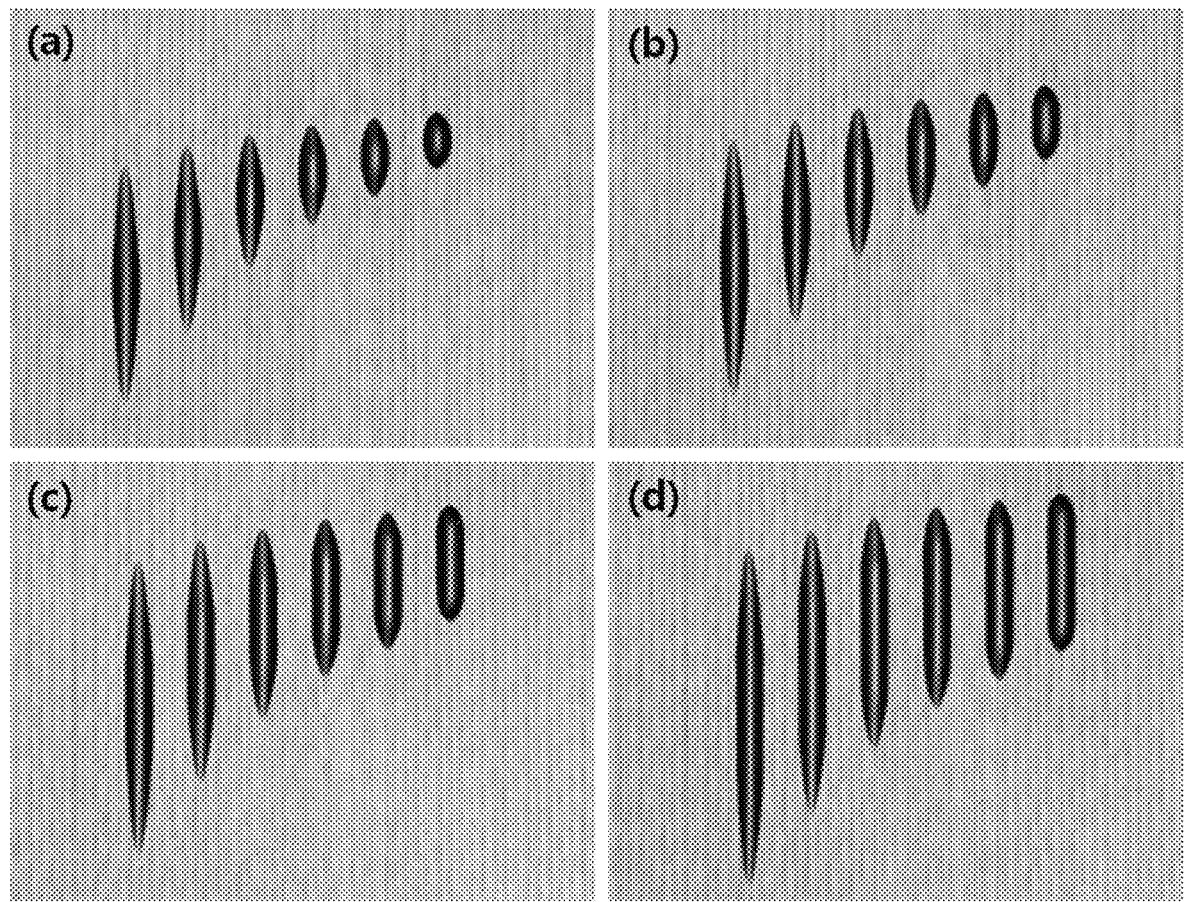

[Fig. 9]
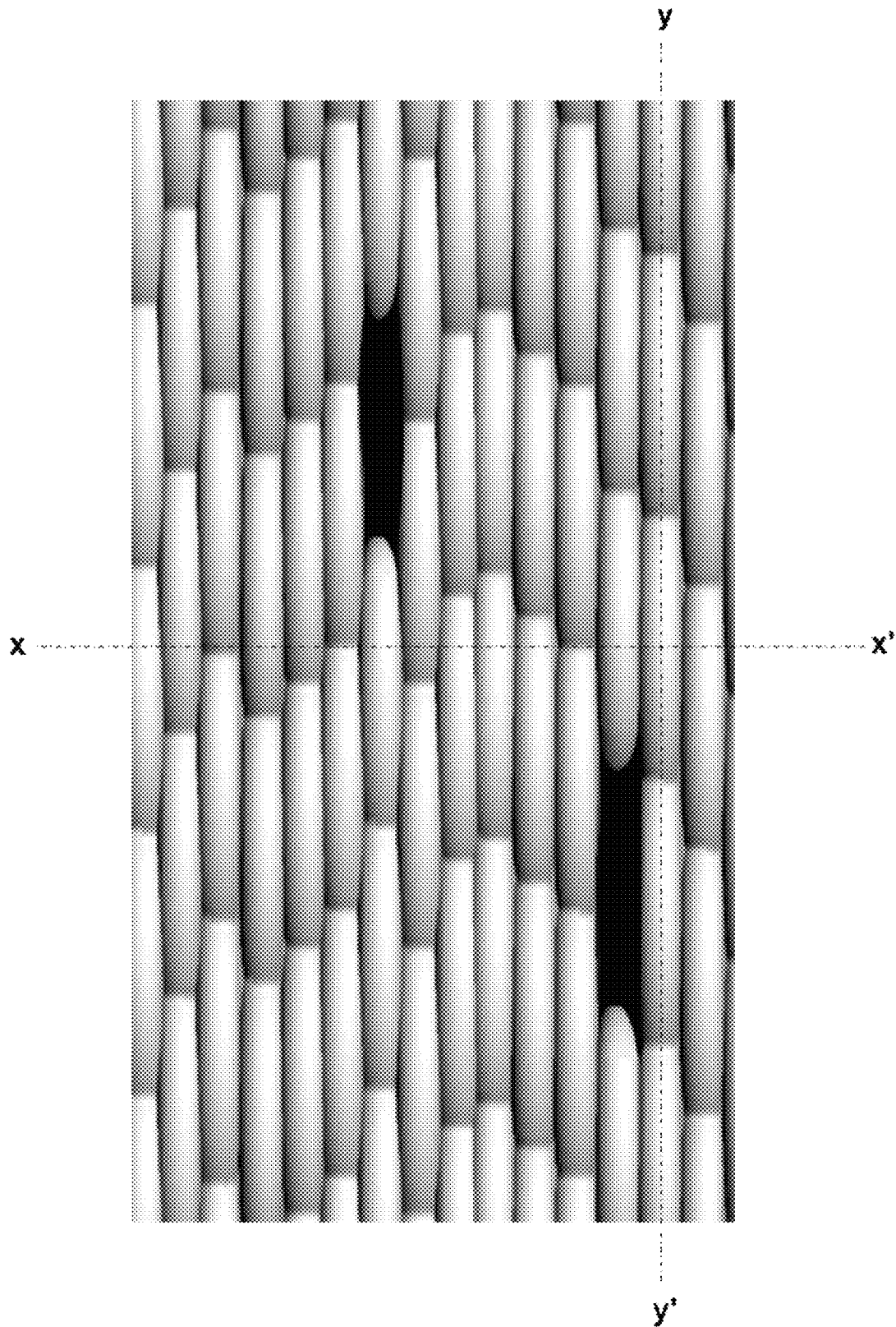

[Fig. 10a]
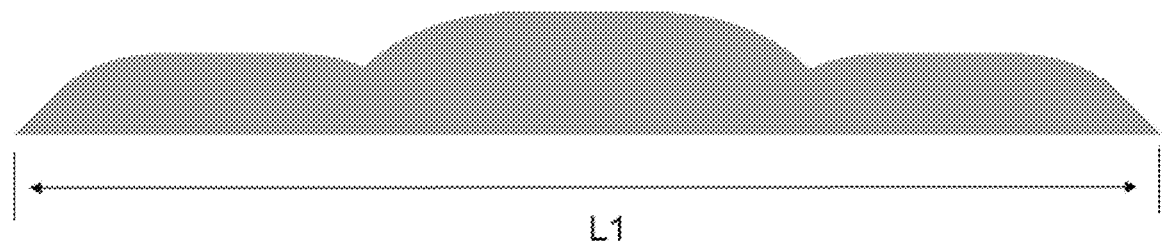
[Fig. 10b]
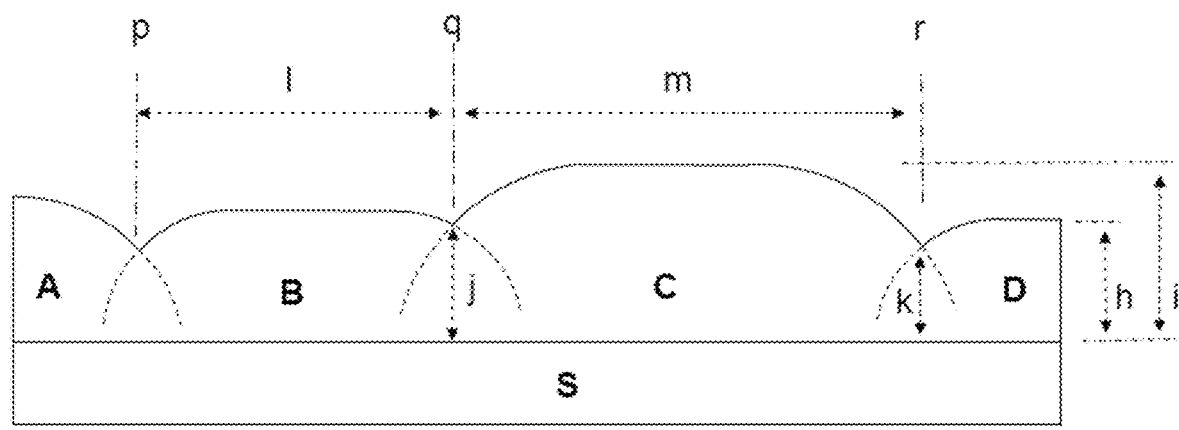
[Fig. 10c]
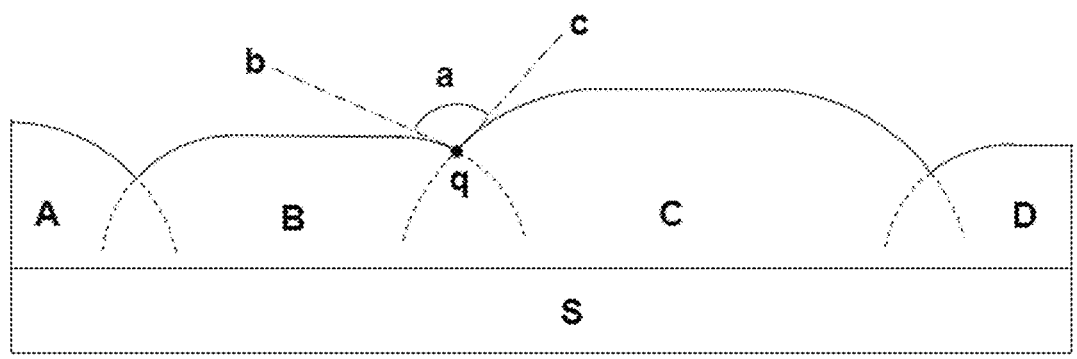

[Fig. 11]
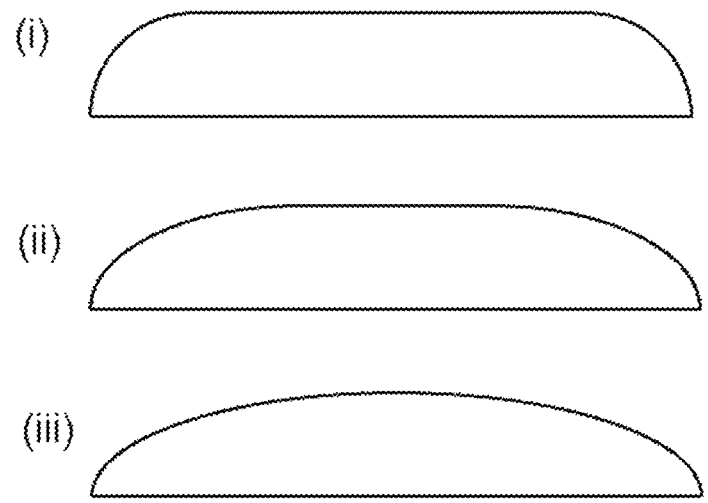
[Fig. 12]
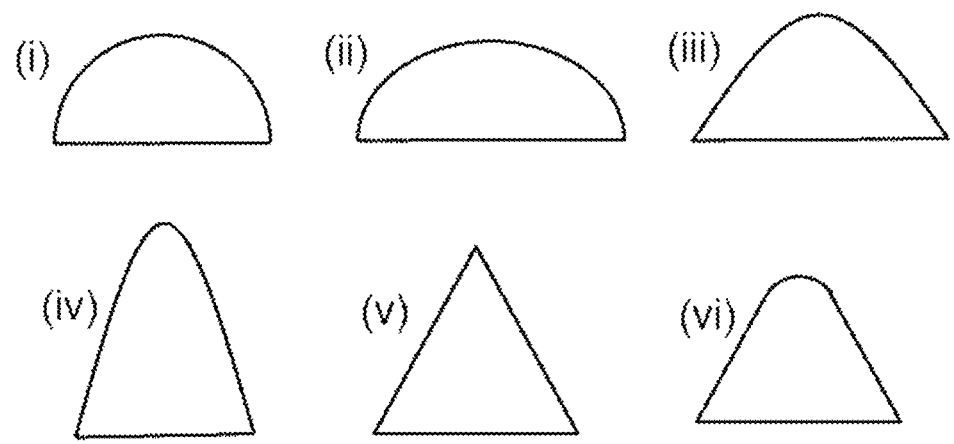

[Fig. 13]
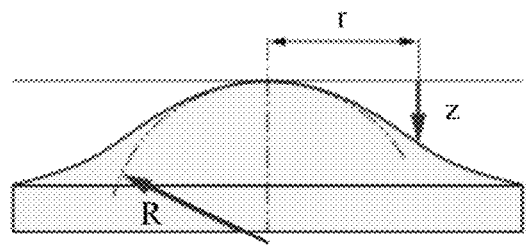

DECORATION SHEET HAVING DISCONTINUOUS LENTICULAR LENS

This application is a National Stage of International Application No. PCT/KR2017/000900 filed Jan. 25, 2017, claiming priority based on Korean Patent Application No. 10-2017-0000686 filed Jan. 3, 2017.

TECHNICAL FIELD

The present invention relates to a decoration sheet applied to an exterior material of a home appliance or an electronic device. More specifically, the present invention relates to a decoration sheet having a pattern layer of a lenticular lens.

BACKGROUND ART

A decoration sheet (or a deco sheet) can be applied to an exterior material of home appliances such as TV, refrigerator, air conditioner, and the like, or electronic devices such as smartphone, tablet, and the like, thereby exhibiting a desired color and pattern. A decoration sheet is generally composed of a film of PET or the like as a base layer, a pattern layer for exhibiting various patterns, a printing layer for exhibiting a color, a vapor deposition layer for exhibiting a color and a metallic effect, an adhesive layer, and the like. The structure thereof may be modified in various ways in terms of the lamination sequence, manufacturing process, and materials (see Korean Patent No. 0896623).

The surface to which a decoration sheet is applied may be a metal plate, plastic, glass, or the like, and the adhesion of the decoration sheet may be adjusted accordingly. Home appliances having a relatively large volume mainly use an exterior material of a steel plate and require subsequent processing such as pressing to form a specific shape. Thus, a decoration sheet having a strong adhesive strength is required. On the other hand, since small-sized mobile devices mainly use an exterior material of glass or plastic, a decoration sheet with a weak adhesive strength may be used. In addition, a decoration sheet with an adhesive strength that can perform a shatterproof function is required for the exterior material of a glass material.

DISCLOSURE OF INVENTION

A decorative sheet has various pattern layers such as a metal effect pattern, a soft feeling pattern, and the like.

Meanwhile, a lenticular lens pattern is formed by arranging lenses having an elongated shape and a cross-section of a semicircle, an ellipse, a hyperbola, or the like. In the past, it was mainly used for optical functions such as enhancement of brightness, whereas it has been recently adopted in a decoration sheet to impart a hue and a sense of depth.

However, since it is difficult for the pattern of a lenticular lens itself to implement a design, a printing layer or the like must be additionally formed on the decoration sheet. In addition, due to the transparent characteristics inherent to a lenticular lens, such a defective phenomenon as foreign objects or scratches are well recognized, which is disadvantageous in terms of the production yield and the like.

Accordingly, an object of the present invention is to provide a decoration sheet having a pattern layer, which itself can implement a design while maintaining the color and the sense of depth of a lenticular lens and also can reduce defective visibility, and a process for manufacturing the same.

According to the above object, the present invention provides a decoration sheet, which comprises a pattern layer in which lenticular lenses are arranged in a plurality of rows, wherein at least one of the plurality of rows has at least one discontinuous lens section in which the lenticular lenses are not continuous.

According to the above object, the present invention provides a process for manufacturing a decoration sheet, which comprises forming a pattern layer on a base layer, wherein lenticular lenses are arranged in a plurality of rows in the pattern layer, and at least one of the plurality of rows has at least one discontinuous lens section in which the lenticular lenses are not continuous.

The decoration sheet according to the present invention can reduce defective visibility and improve productivity by inserting a discontinuous lens section in the lenticular lens pattern.

In addition, the discontinuous lens sections are arranged randomly or to form a letter, a shape, or the like, so that it is possible to provide a sense of pattern in addition to the color and the sense of depth intrinsic to the lenticular lens. In particular, although a conventional decoration sheet forms a letter and a shape by a printing layer, the decoration sheet according to the present invention can implement it by only the pattern layer of a lenticular lens rather than a printing layer.

In addition, if the individual lenticular lenses are configured to have a shape in which the tandem-arrayed convex microlenses partially overlap with each other to thereby be randomly connected, both the hiding power and the optical characteristics are improved, while it is possible to prevent such phenomena as unnecessary wrinkles, unintended pattern recognition, wet-out, and the like.

In addition, the decoration sheet may have an adhesive layer, so that it can further perform a shatterproof function for the surface of, e.g., glass to which it is applied.

Accordingly, the decoration sheet can be advantageously applied to an exterior material of home appliances such as TV, refrigerator, air conditioner, and the like, or electronic devices such as smartphone, tablet, and the like.

BRIEF DESCRIPTION OF DRAWINGS

FIGS. 1a and 1b are a plan view and a three-dimensional scan image of the pattern layer of a decoration sheet according to an embodiment, respectively.

FIGS. 2a and 2b show the shape of the connection part according to the degree of overlapping between lenses.

FIGS. 3a to 3h are images showing the distribution pattern of randomly arranged discontinuous lens sections based on the number per unit area.

FIGS. 4a and 4b illustrate examples of images that can be implemented by discontinuous lens sections.

FIG. 5 shows an example of a pattern for implementing a design image.

FIGS. 6a to 6c illustrate examples of pattern layers fabricated by implementing various design images.

FIGS. 7 and 8 show examples of planar shapes of individual microlenses.

FIG. 9 is a plan view of lenticular lenses composed of microlenses arranged in series.

FIGS. 10a to 10c are cross-sectional views of lenticular lenses according to an embodiment in the row direction (y-y' direction in FIG. 9).

FIG. 11 illustrates the cross-sectional shape of individual microlenses (y-y' direction in FIG. 9).

FIG. 12 illustrates the cross-sectional shape of individual microlenses (x-x' direction in FIG. 9).

FIG. 13 illustrates a cross-section (x-x' direction in FIG. 9) of a lenticular lens in terms of the aspheric constant value.

REFERENCE NUMERALS OF THE DRAWINGS

L: lenticular lens
N: discontinuous lens section
R1 to R7: rows
w: width
d: length of a discontinuous lens section
x-x': direction perpendicular to the row
y-y': the row direction
A, B, C, and D: microlenses
S: base layer
p, q, and r: overlapping point
l and m: distance between overlapping points
h and i: height of a microlens
j and k: height of an overlapping point

DETAILED DESCRIPTION OF THE INVENTION

Hereinafter, the present invention will be described more specifically with reference to the accompanying drawings.

FIGS. 1a and 1b are a plan view and a three-dimensional scan image, obtained with a confocal microscope, of the pattern layer of a decoration sheet according to an embodiment, respectively.

The decoration sheet according to the present invention comprises a pattern layer in which lenticular lenses (L) are arranged in a plurality of rows (R1, R2, R3, and so on), wherein at least one of the plurality of rows has at least one discontinuous lens section (N) in which the lenticular lenses are not continuous.

Discontinuous Lens Section

In the pattern layer of the decoration sheet according to the present invention, at least one of the plurality of rows in which lenticular lenses are arranged has at least one discontinuous lens section in which the lenticular lenses are not continuous.

The discontinuous lens sections in the decoration sheet may appear darker or brighter than the lenticular lenses. In addition, if a colored layer is employed in the decoration sheet or if the lenticular lenses in the pattern layer are colored with a dye or the like, the discontinuous lens sections may be seen as a different color from that of the lenticular lenses. Thus, the discontinuous lens sections in the decoration sheet may be recognized by an observer.

Here, since the discontinuous lens sections have a very small dimension of the order of several micrometers, one discontinuous lens section is not clearly recognized by the observer's eyes. However, if the plurality of discontinuous lens sections are arranged in a predetermined rule to form a specific design, it can be clearly recognized by the observer's eyes, thereby imparting a sense of aesthetics. In addition, if the discontinuous lens sections are arranged at random positions even if the number thereof increases, it is not clearly recognized by the observer's eyes, but the defective visibility can be reduced, thereby enhancing the production yield of the decoration sheet.

According to an example, the discontinuous lens sections (N) may be regularly arranged in the pattern layer. Preferably, the pattern layer may have two or more discontinuous lens sections, and the two or more discontinuous lens sections may be arranged in the form of a regular pattern, image, figure, or character.

FIGS. 4a and 4b illustrate examples of images that can be implemented by the discontinuous lens sections. As shown in the drawings, if the discontinuous lens sections are regularly arranged, they may form a letter, a number, a symbol, or the like, or a linear regular pattern.

In addition, according to the present invention, various images may be implemented by the discontinuous lens sections. As shown in FIGS. 5 and 6a to 6c, the pattern layer can implement various design images by the discontinuous lens sections regardless of the type or the complexity of the design image.

For example, in the case where an image of the galaxy is implemented as shown in FIG. 5, the size or density of the stars in the image can be implemented by the length or density of the discontinuous lens sections.

In addition, as shown in FIG. 6c, the pattern layer may be colored by the addition of a dye or the like, thereby exhibiting a specific color.

According to another example, the discontinuous lens sections (N) may be randomly arranged in the pattern layer. Preferably, the pattern layer may have two or more discontinuous lens sections, and the two or more discontinuous lens sections may be arranged at random positions in the pattern layer.

In such event, the pattern layer may contain the discontinuous lens sections in an amount of 10 to 3,000 per 1 $cm^2$. More preferably, the pattern layer may contain the discontinuous lens sections in an amount of 100 to 1,000 per 1 $cm^2$.

If the number of the discontinuous lens sections per unit area is too small, the discontinuous lens sections may appear as a defect. On the other hand, if it is too large, there is a possibility that a specific figure is recognized even if they are randomly distributed. Thus, it is expected that the defective visibility can be the most effectively reduced within the above preferable range (see FIGS. 3a to 3h).

FIGS. 2a and 2b show the shape of the connection part according to the degree of overlapping between lenses. As shown in the drawings, the length (d) of the discontinuous lens sections may vary in a variety of ways.

For example, the length (d) of the discontinuous lens sections is not particularly limited. For example, the length may be 0.1 μm or more, or 1 μm or more, to the minimum, and the length may be substantially the same as the length of the row to the maximum.

As described above, the decoration sheet according to the present invention can reduce defective visibility and improve productivity by inserting a discontinuous lens section in the lenticular lens pattern.

In addition, the discontinuous lens sections are arranged randomly or to form a letter, a shape, or the like, so that it is possible to provide a sense of pattern in addition to color and a sense of depth intrinsic to the lenticular lens. In particular, although a conventional decoration sheet forms a letter and a shape by a printing layer, the decoration sheet according to the present invention can implement it by only the pattern layer of a lenticular lens rather than a printing layer.

Therefore, the decoration sheet of the present invention does not necessarily comprise a printing layer conventionally employed and preferably does not comprise a printing layer, thereby reducing the number of processing steps, making thin the decoration sheet, and reducing the cost.

Lenticular Lens

The lenticular lenses provided in the pattern layer are arranged in a plurality of rows and may have a typical lenticular lens shape.

The lenticular lenses may have an elongated shape similar to the conventional lenticular lenses.

FIG. 1a is a plan view of the pattern layer of a decoration sheet according to an embodiment.

As shown in FIG. 1a, the width of the lenticular lenses may be equal to the width (w) of each row. As a preferred example, each of the plurality of rows may have a width of 5 μm to 300 μm. More specifically, it may have a width in the range of 10 μm to 200 μm or in the range of 30 μm to 100 μm.

In addition, the length of the lenticular lenses is not particularly limited. For example, the length may be 1 μm or more to the minimum, and the length may be substantially the same as the length of the row to the maximum.

In addition, the height of the lenticular lenses may be 0.01 to 3 times the width (w) of the lenticular lenses. Specifically, it may be 0.05 to 1 time the width (w) of the lenticular lenses.

In addition, the lenticular lenses may have a wide variety of cross-sectional shapes.

For example, as shown in FIG. 12, the lenticular lenses may have a cross-sectional shape of a semicircle (i), a semiellipse (ii), a parabola (iii), a hyperbola (iv), a pointed triangle (v), or a rounded triangle (vi) on the cross-section (x-x' direction in FIG. 9) perpendicular to the row direction of the pattern layer.

As another example, the lenticular lenses may have a cross-sectional shape of an aspheric lens determined by a conic constant value on the cross-section perpendicular to the row direction of the pattern layer.

FIG. 13 illustrates an aspheric lens and a cross-section of a lenticular lens determined by a conic constant value. Specifically, the cross-sectional shape of the lenticular lens can be determined by the following Equation 1.

$$z(r) = \frac{r^2}{R\left(1 + \sqrt{1 - (1+\kappa)\frac{r^2}{R^2}}\right)}$$ [Equation 1]

In the above Equation, r is the distance from the center axis of a lens cross-section, z(r) is the z component of the displacement from the vertex to the lens surface at a distance r, R is the radius of curvature (see FIG. 13), and κ is a conic constant as defined in Table 1 below.

TABLE 1

| κ | Shape |
|---|---|
| κ < −1 | Hyperbola |
| κ = −1 | Parabola |
| −1 < κ < 0 | Prolate spheroid |
| κ = 0 | Semicircle |
| κ > 0 | Oblate spheroid |

Overlapping of Microlenses

According to a preferred example, the individual lenticular lenses may have a shape in which the tandem-arrayed convex microlenses partially overlap with each other to thereby be connected.

As a specific example, as shown in FIG. 9, the microlenses are arranged in a plurality of rows (y-y' direction in FIG. 9) and may have a shape in which neighboring microlenses in the same row partially overlap with each other to thereby be connected. In FIG. 9, the void sections (i.e., black sections) in the microlenses indicate the discontinuous lens sections.

The configuration of the lenticular lens by such microlenses as described above has the characteristics of a conventional lenticular lens and also has a partly overlapping connection part in each row. Thus, it produces the effect of preventing the wrinkling phenomenon, which is a weak point of conventional UV-cured products, by reducing the influence of the resin even in a high-temperature or high-humidity environment.

When viewed from above, the shape of the microlenses may be substantially elongated in the row direction (y-y') as shown in FIG. 9. For example, when the pattern layer is viewed from above, the width of each of the plurality of rows (y-y') in which the microlenses are arranged in series may be, for example, in the range of 5 to 300 μm. More specifically, it may be in the range of 10 to 200 μm or in the range of 30 to 100 μm.

The size of the individual microlenses may be in the range of 5 to 300 μm in the transverse direction of the rows. More specifically, it may be in the range of 10 to 200 μm or 30 to 100 μm. It may be in the range of 10 to 3,000 μm or in the range of 30 to 2,000 μm in the longitudinal direction of the rows.

In addition, the distances between the overlapping points of the microlenses that constitute the individual lenticular lenses in the same row may be varied depending on the degree of overlapping. For example, it may be in the range of 30 to 2,000 μm.

FIGS. 7 and 8 show examples of planar shapes of individual microlenses.

As shown in FIG. 7, the individual microlenses may have a shape that becomes narrower toward both ends when viewed in a plan view. Specifically, the microlens is divided into three parts, that is, a head (10), a body (20), and a tail (30) in a plan view. These three parts are integrally connected to each other.

The head (10) and the tail (30) may have a shape in which the width (w) becomes narrower toward the ends. For example, it may have a shape of a semicircle, a semiellipse, a parabola, a pointed triangle, or a rounded triangle.

The head (10) and the tail (30) may have the same length and shape. But they may be designed to have different shapes or lengths as required.

The body (20) may have the same width (w) as a whole.

As shown in FIG. 8, the individual microlenses may have a wide variety of shapes by adjusting the lengths (or dimensions) of the head, the body, and the tail.

For example, the head and the tail may have the same length. The body may have a length of 10 to 3,000 μm or 30 to 2,000 μm.

In addition, preferably, the ratio of the length of the head or the tail to the width of the body may be in the range of 0.1 to 3. More specifically, it may be in the range of 0.1 to 1.5, in the range of 0.3 to 1.5, or in the range of 0.4 to 0.5. The shape of the discontinuous lens section may be desirable when fabricated in the above preferable range.

According to a specific example, the microlens is divided into three parts of a head, a body, and a tail in a plan view, these three parts are integrally connected to each other, the head and the tail have the same length, the body has a length of 10 to 3,000 μm or 30 to 2,000 μm, the head and the tail have a shape in which the width becomes narrower toward the ends, the body has the same width as a whole, and the ratio of the length of the head or the tail to the width of the body is in the range of 0.1 to 1.5.

FIGS. 10a to 10c are cross-sectional views of lenticular lenses according to an embodiment in the row direction (y-y' direction in FIG. 9).

As shown in FIG. 10a, the lenticular lens according to an embodiment is formed such that the tandem-arrayed convex microlenses partially overlap with each other to thereby be connected. In such event, the length of the lenticular lens corresponds to the total length (L1) of the microlenses that partially overlap to thereby be connected.

In addition, as illustrated in FIG. 10b, the microlenses (A, B, C, and D) arranged in a line in the same row to constitute the individual lenticular lenses may have a distance (p, q, r) between their overlapping points (l, m) in the range of, for example, 10 to 3,000 μm, or the distance may be in the range of 30 to 2,000 μm or in the range of 300 to 700 μm. In particular, the distance between the points where the microlenses overlap with each other may be changed randomly in the same row. Since the overlapping and connecting parts are randomly formed as described above, it is possible to prevent a phenomenon that an unintended pattern is visually recognized.

In addition, the degree of overlapping between the microlenses may be random. Referring to the microlens (C) in FIG. 10b as an example, the height (j, k) of the overlapping points (q, r) with the neighboring lenses (B, D) from the base layer (S) may be different from each other, and the height (j, k) of the overlapping points may vary randomly in the same row. For example, the height (j, k) of the overlapping points may be random within a range of greater than 0 μm and less than 300 μm, or it may be random within a range of greater than 0 μm and less than 50 μm.

In addition, the microlenses that constitute the individual lenticular lenses may have heights (h, i) different from each other in the same row. Since the microlenses are formed with different heights as described above, it is possible to prevent the wet-out phenomenon. For example, the microlenses have heights different from each other in the same row, and the ratio of the maximum height to the minimum height of the microlenses may be greater than 1 and up to 3, or greater than 1 and up to 1.5. In addition, the maximum height of the microlenses may be, for example, 1 to 300 μm or 1 to 50 μm.

In addition, as illustrated in FIG. 10c, when tangent lines (q-b, q-c) are drawn on the surfaces of two neighboring microlenses (B, C) at the point (q) where the two microlenses (B, C) overlap on the cross-section parallel to the row direction of the pattern layer, the angle (a) between the tangent lines may range from 150° to less than 180°. If the angle between the tangent lines is within the above range, the degree of overlapping is increased, and the non-visibility of the discontinuous lens sections can be improved (see FIG. 2B). As a result, it may be more advantageous to prevent the phenomenon that an unintended pattern is recognized.

In addition, as shown in FIG. 11, when the cross-sectional shape in the row direction (y-y' direction in FIG. 9) is viewed, the individual microlenses have a trapezoidal cross-sectional shape with rounded corners or a semi-elliptical cross-sectional shape if the overlapping parts are not considered. For example, they may have a cross-section of a shape that has a long flat lens body (i), a short flat lens body (ii), or no flat lens body. In such event, the overlapping of the microlenses may be formed in the curved parts on the left and right sides of the lenses in the cross-sectional shape.

In addition, as shown in FIG. 12, the microlenses may have a wide variety of cross-sectional shapes on a cross-section perpendicular to the row direction of the pattern layer. For example, when the cross-section (x-x' direction in FIG. 9) perpendicular to the row direction of the pattern layer is observed, they may have a cross-sectional shape of a semicircle (i), a semiellipse (ii), a parabola (iii), a hyperbola (iv), a pointed triangle (v), or a rounded triangle (vi). Preferably, if an aspherical shape such as a semi-elliptical or parabolic shape is adopted as a cross-section of the microlenses, it is possible to improve the sense of depth and to exhibit various colors depending on the viewing angles. For example, the cross-sectional shape of the microlenses may be determined using the aspheric lens formula and the conic constant value. Specifically, it can be determined by FIG. 13 and Equation 1 as described above.

Layer Configuration of the Decoration Sheet

According to an example, the decoration sheet of the present invention may further comprise a base layer formed on one side of the pattern layer.

According to another example, the decoration sheet of the present invention may further comprise a base layer formed on one side of the pattern layer; and an adhesive layer formed on the other side of the base layer. In such event, the adhesive layer may have a shatterproof function.

According to still another example, the decoration sheet of the present invention may further comprise a base layer formed on one side of the pattern layer; an adhesive layer formed on the other side of the base layer; and a release film laminated on the surface of the adhesive layer.

The decoration sheet can be applied to an exterior material of home appliances such as TV, refrigerator, air conditioner, and the like, or electronic devices such as smartphone, tablet, and the like, thereby exhibiting a desired color and pattern.

As an example, the decoration sheet may be applied to a case of a mobile device or the like having a transparent plastic or glass plate as a bottom layer. In such event, the decoration sheet may have a laminated structure of a colored layer/a pattern layer/a base layer/an adhesive layer/a release film, and the adhesive layer is attached to the inner surface of the transparent plastic or glass plate.

As another example, the decoration sheet may be applied to a case of a large white home appliance or the like having a rolled steel sheet as a bottom layer. In such event, the decoration sheet may have a laminated structure of a pattern layer/a base layer/a colored layer/an adhesive layer, and the adhesive layer is attached to the outer surface of the home appliance.

Since the decoration sheet of the present invention can implement a design thanks to its own lens pattern, a printing layer employed in a conventional decoration sheet is not necessarily required. However, the decoration sheet may further comprise a printing layer on one side of the pattern layer for the absorption of light, the exhibition of color, and the like.

The laminated structure of the decoration sheet as described above is illustrative and can be changed in various ways depending on the product to which it is applied and as required. In addition, the decoration sheet of the present invention may further comprise additional functional layers in addition to those described above.

Hereinafter, the material and features of each constituent layer will be described in detail.

The base layer may be a transparent film, for example, a transparent polymer film. The base layer may comprise a polymeric resin selected from the group consisting of polyolefin, polystyrene, polycarbonate, polyester, cellulose, acrylic, polyvinyl chloride, and a mixture thereof. Specifically, the base layer may comprise a polymeric resin selected from the group consisting of polyethylene, polypropylene, polystyrene, polycarbonate, polyethylene naphthalate, polyethylene terephthalate, polybutylene terephthalate, triacetyl cellulose, acrylic, polyvinyl chloride, and a mixture thereof. More specifically, the base layer may be a polyethylene terephthalate film for high durability, mechanical strength, and transparency.

The base layer may be uniaxially or biaxially stretched as required to enhance its mechanical strength or optical function.

The base layer may have a preferable thickness depending on the material. Specifically, the base layer may have a thickness of 100 μm or less. More specifically, the base layer may have a thickness of 23 to 100 μm. If the thickness of the base layer is within the above range, it is suitable to make a mobile device thin.

The pattern layer may be a pattern layer of a lenticular lens and may have the structure and features as described above.

The pattern layer may be made of a photocurable resin, and the microlenses may be made of a material the same as, or different from, that of the base layer. The photocurable resin is not particularly limited as long as it is curable with an active energy ray such as ultraviolet rays or electron beams. Specific examples thereof include polyesters; epoxy resins; (meth)acrylate resins such as polyester (meth)acrylate, epoxy (meth)acrylate, and urethane (meth)acrylate; and a mixture thereof. A (meth)acrylate resin among them is particularly preferable from the viewpoint of optical characteristics.

The photocurable resin preferably has a refractive index in the range of 1.41 to 1.59. When the refractive index of the resin upon curing is 1.41 or more, it is possible to prevent a decrease in the light diffusion effect and a decrease in the hiding power due to an increase in the total light transmittance. When it is 1.59 or less, it is possible to prevent a decrease in the luminance due to a decrease in the total light transmittance.

The colored layer and the printing layer may be formed on one side of the pattern layer or one side of the base layer to impart a color or a texture to the decoration sheet.

The colored layer may be, for example, a multiple vapor deposition layer in which one or more kinds of colored inorganic particles or colored metallic particles are deposited.

The printing layer may comprise a colorant. The colorant may be a black dye or pigment. For example, it may be an organic colorant such as carbon black, reactive dyes, azo dyes, nigrosine, perylene pigments, and aniline black. The colorant may be uniformly dispersed in the printing layer.

The adhesive layer is made of optically clear adhesive (OCA), which can eliminate the air layer, improve the visibility, and improve the heat insulation property. The adhesive layer may be used, for example, for attachment to a display made of glass.

The adhesive layer may comprise a polymer resin and a curing agent. The polymer resin is not particularly limited, but it may be a resin that is not yellowed by ultraviolet rays and has good dispersibility of a UV absorbent. For example, the polymer resin may be a polyester resin, an acrylic resin, an amino resin, or the like. The polymer resin may be used alone or as a copolymer or a mixture of two or more kinds thereof. An acrylic resin among them is preferable since it is excellent in optical properties, weatherability, adhesion to a substrate, and the like.

The acrylic resin may be formed by polymerizing at least one acrylic monomer and at least one carboxyl group-containing unsaturated monomer. Specifically, examples of the acrylic monomer include methyl (meth)acrylate, ethyl (meth)acrylate, butyl (meth)acrylate, dimethylaminoethyl (meth)acrylate, isobutyl (meth)acrylate, t-butyl (meth)acrylate, cyclohexyl (meth)acrylate, ethylhexyl (meth)acrylate, tetrahydroperfuryl (meth)acrylate, hydroxyethyl (meth)acrylate, 2-hydroxypropyl (meth)acrylate, 2-hydroxy-3-chloropropyl (meth)acrylate, 4-hydroxybutyl (meth)acrylate, glycerol (meth)acrylate, methyl α-hydroxymethyl acrylate, ethyl α-hydroxymethyl acrylate, propyl α-hydroxymethyl acrylate, butyl α-hydroxymethyl acrylate, 2-methoxyethyl (meth)acrylate, 3-methoxybutyl (meth)acrylate, ethoxy diethylene glycol (meth)acrylate, methoxy triethylene glycol (meth) acrylate, methoxy tripropylene glycol (meth)acrylate, poly(ethylene glycol) methyl ether (meth)acrylate, tetrafluoropropyl (meth)acrylate, 1,1,1,3,3,3-hexafluoroisopropyl (meth)acrylate, octafluoropentyl (meth)acrylate, heptadecafluorodecyl (meth)acrylate, isobornyl (meth)acrylate, dicyclopentanyl (meth)acrylate, dicyclopentenyl (meth)acrylate, dicyclopentanyloxyethyl (meth)acrylate, dicyclopentenyloxyethyl (meth)acrylate, and a mixture thereof.

More specifically, examples of the acrylic monomer may include methyl (meth)acrylate, butyl (meth)acrylate, and a mixture thereof. Specifically, examples of the carboxyl group-containing unsaturated monomer include acrylic acid, methacrylic acid, 2-(meth)acryloyloxyacetic acid, 3-(meth)acryloyloxypropyl acid, 4-(meth)acryloyloxybutyric acid, an acrylic acid dimer, itaconic acid, maleic acid, maleic anhydride, and a mixture thereof. More specifically, examples of the carboxyl group-containing unsaturated monomer may include methacrylic acid, acrylic acid, and a mixture thereof.

The curing agent is not particularly limited as long as it is a substance capable of curing the polymer resin. Specifically, it may be selected from the group consisting of an isocyanate curing agent, an epoxy curing agent, and an aziridine curing agent, which are not yellowed by ultraviolet rays. In addition, the curing agent may be employed in an amount of 0.2 to 0.5% by weight based on the total weight of the adhesive layer. Specifically, the curing agent may be employed in an amount of 0.3 to 0.5% by weight, 0.3 to 0.45% by weight, or 0.35 to 0.45% by weight, based on the total weight of the adhesive layer. If the content of the curing agent is within the above range, the adhesive strength is not deteriorated, and the durability is not deteriorated in a heat-resistant and moisture-resistant environment.

In addition, the adhesive layer may further comprise such additives as an antioxidant, a light stabilizer (e.g., a hindered amine-based light stabilizer), a photoinitiator for UV curing, and the like.

The photoinitiator may be at least one selected from the group consisting of benzophenone-based, thioxanthone-based, α-hydroxy ketone-based, ketone-based, phenyl glyoxylate-based, and acyl phosphine oxide-based.

The adhesive layer may have an adhesive strength of 10 N/inch or more to glass in order to prevent shattering of the glass when the glass is broken. Specifically, the adhesive layer may have an adhesive strength of 10 to 30 N/inch or more to glass. If the adhesive strength of the adhesive layer is within the above range, it is advantageous in that the shattering prevention effect is sufficient and that a rework process for recycling glass can be readily performed when a defective product is produced in the process.

The adhesive layer may have a glass transition temperature of −40° C. or higher in order to suppress compressibility by the process and an external foreign matter. Specifically, the adhesive layer may have a glass transition temperature of −40° C. to −15° C. or −30° C. to −15° C.

The adhesive layer may have a thickness of 10 μm to 30 μm. Specifically, it may have a thickness of 15 μm to 25 μm, 15 μm to 20 μm, or 15 μm to 17 μm. If the thickness of the adhesive layer is within the above range, it is possible to prevent defects due to compression and to maintain the adhesive strength of the adhesive layer to an appropriate level.

The release film may be a plastic film such as polyethylene terephthalate or polycarbonate, and it may be a film whose surface is release-coated with silicone.

The release film may have a thickness of 50 μm or more, 50 μm to 125 μm, or 75 μm to 125 μm.

The release film may have a delamination force of 100 gf/inch or less with respect to the Tesa 7475 tape. Specifically, the release film may have a delamination force of 80 gf/inch or less, or 30 to 80 gf/inch, with respect to the Tesa 7475 tape. If the delamination force of the release film is within the above range, defects due to the delamination between the adhesive layer and the release film do not occur during the deposition step in the subsequent process, and the release film can be easily peeled off before adhesion to glass.

In order to prevent curl in the high-temperature printing process, the film in which the pattern layer, the base layer, and the adhesive layer are laminated in order and the release film may have a heat shrinkage deviation of 50% or less. If the heat shrinkage deviation is 50% or less, curl is not generated upon the repeated printing process, so that dimensional stability of the film can be ensured for the subsequent process.

Manufacture of the Decoration Sheet

The decoration sheet may be manufactured by a process, which comprises forming a pattern layer on a base layer, wherein lenticular lenses are arranged in a plurality of rows in the pattern layer, and at least one of the plurality of rows has at least one discontinuous lens section in which the lenticular lenses are not continuous.

The pattern layer may be formed using various processes.

For example, a high-precision pattern processor may be used to physically process a mold having a microlens pattern, and a pattern layer is then obtained by UV-casting a photocurable resin onto the mold with the pattern inscribed.

In such event, the position, length, and the like of the discontinuous lens sections can be determined by programming.

Specifically, in order to implement a regular pattern, image, figure, or character, a design to be implemented is subdivided into fine dots to calculate the number of unit dots and individual coordinates thereof, followed by inputting this information to a pattern processor and pre-programming the same, thereby implementing the discontinuous lens sections.

For example, it is possible to program that a design to be implemented is changed to a black and white image, the lenticular lens section is assigned to either the black part or the white part on the black and white image, and the discontinuous lens section is assigned to the other.

As a specific example, the pattern layer may be formed by the steps of changing a design to be implemented to a black and white image; inverting the black and white parts of the black and white image to produce an inverted image; programming a pattern processor to assign a lenticular lens to the black part of the inverted image and to assign a discontinuous lens section to the white part of the inverted image; and forming a pattern layer on the base layer by the pattern processor.

In addition, in order to implement a discontinuous lens section at random positions, random coordinates are calculated with the desired number per unit area, followed by inputting this information to a pattern processor and pre-programming the same, thereby implementing the discontinuous lens sections. The method for producing the random coordinates may be, for example, the molecular dynamics method, the Monte Carlo method, or the like.

Hereinafter, the present invention will be described in detail with reference to examples.

However, the following examples are illustrative of the present invention, and the scope of the present invention is not limited to the following examples.

Example 1: Shape According to the Spacing Distance Between Lenticular Lenses

A pattern layer was produced by changing the degree of overlapping or spacing between lenticular lenses that have a semicircular cross-sectional shape. The optical microscope image is shown in FIG. 2a.

In addition, FIG. 2b is an enlarged view of the discontinuous lens sections, in which the lenticular lenses are shown in black and the discontinuous lens sections are shown in white.

In FIGS. 2a and 2b, as the degree of overlapping of the lenticular lenses increases from the left to the right, and the length (d) of the discontinuous lens sections gradually decreases.

Example 2: Random Formation of Discontinuous Lens Sections

Images in which the number of discontinuous lens sections per unit area (1 $cm^2$) of the pattern layer is changed to 5, 10, 20, 100, 500, 1000, 2000, and 3000 are shown in FIGS. 3a to 3h, respectively. In these images, the discontinuous lens sections are indicated by white dots, and the black color indicates the sections where the lenticular lenses exist.

The random positions of the discontinuous lens sections were calculated by the molecular dynamics method. As a result, as shown in FIGS. 3a to 3h, the discontinuous lens sections are randomly distributed while having a distribution that does not overlap as much as possible, thereby reducing the defective visibility.

However, when the number per unit area was less than 100, there was a possibility that the discontinuous lens sections appeared as a defect as shown in FIGS. 3a to 3c since their number is small. In addition, when the number per unit area was more than 1000, a pattern similar to a fingerprint was recognized as shown in FIGS. 3g and 3h even though they are randomly distributed.

Therefore, when the number per unit area (1 $cm^2$) was 100 to 1000, it was evaluated that the defective visibility was most effectively reduced as shown in FIGS. 3d to 3f.

Example 3: Manufacture of a Decoration Sheet

Step (1): Preparation of a Base Layer

A polyethylene terephthalate (PET) film (manufacturer: SKC, product name: V7200) having a thickness of 50 μm was prepared as a base layer.

Step (2): Formation of an Adhesive Layer 99.4 parts by weight of an acrylic resin, 0.4 parts by weight of a curing agent, and 0.2 parts by weight of a UV absorber were mixed, which mixture was dissolved in an organic solvent (solids content: 15% by weight), thereby obtaining an optically transparent adhesive resin composition. The optically transparent adhesive composition was coated on one side of the base layer and dried at 100° C. for 3 minutes, thereby forming an adhesive layer having a dry thickness of 20 µm.

Thereafter, a release film having a thickness of 100 µm was laminated on the surface of the adhesive layer, followed by aging it at 40° C. for 3 days.

Step (3): Formation of a Pattern Layer of a Lenticular Lens

A mold of a lenticular lens pattern was physically processed on the surface of a pattern roller by using a high-precision pattern processor. A pattern layer was then obtained by UV-casting a photocurable resin onto the other side of the base resin using the mold with the pattern inscribed.

The invention claimed is:

1. A decoration sheet, which comprises a pattern layer in which lenticular lenses are arranged in a plurality of rows,
    wherein at least one of the plurality of rows has at least two discontinuous lens sections having a dimension on the order of several micrometers in which the lenticular lenses are not continuous,
    wherein the individual lenticular lenses have a shape of tandem-arrayed convex microlenses partially overlapped with each other,
    wherein when tangent lines are drawn on the surfaces of two neighboring microlenses at the point where the two microlenses overlap on the cross-section parallel to the row direction of the pattern layer, the angle between the tangent lines ranges from 150° to less than 180°, and
    wherein the discontinuous lens sections may be regularly or randomly arranged in the pattern layer for implementing design images.

2. The decoration sheet of claim 1, wherein the pattern layer contains discontinuous lens sections in an amount of 10 to 3,000 per 1 $cm^2$.

3. The decoration sheet of claim 1, wherein the pattern layer contains discontinuous lens sections in an amount of 100 to 1,000 per 1 $cm^2$.

4. The decoration sheet of claim 1,
    wherein the at least two discontinuous lens sections are arranged in the form of a regular pattern, image, figure, or character.

5. The decoration sheet of claim 1, wherein each of the plurality of rows has a width of 5 µm to 300 µm.

6. The decoration sheet of claim 1, wherein the lenticular lenses have a cross-sectional shape of an aspheric lens determined by a conic constant value on the cross-section perpendicular to the row direction of the pattern layer.

7. The decoration sheet of claim 1, which further comprises a base layer formed on one side of the pattern layer; and
    an adhesive layer formed on the other side of the base layer.

8. The decoration sheet of claim 1, wherein distance between the points where the tandem-arrayed convex microlenses overlap with each other varies randomly in the same row.

9. The decoration sheet of claim 1, wherein height of the points where the tandem-arrayed convex microlenses overlap with each other varies randomly in the same row.

10. The decoration sheet of claim 1, wherein each microlens of the tandem-arrayed microlenses are divided into three parts of a head, a body, and a tail in a plan view, these three parts are integrally connected to each other, the head and the tail have the same length, the body has a length of 10 to 3,000 µm, the head and the tail have a shape in which the width becomes narrower toward the ends, the body has the same width as a whole, and the ratio of the length of the head or the tail to the width of the body is in the range of 0.1 to 1.5.

11. A process for manufacturing a decoration sheet, which comprises forming a pattern layer on a base layer, wherein lenticular lenses are arranged in a plurality of rows in the pattern layer, and at least one of the plurality of rows has at least two discontinuous lens section having a dimension of order of several micrometers in which the lenticular lenses are not continuous,
    wherein the individual lenticular lenses have a shape of tandem-arrayed convex microlenses partially overlapped with each other,
    wherein when tangent lines are drawn on the surfaces of two neighboring microlenses at the point where the two microlenses overlap on the cross-section parallel to the row direction of the pattern layer, the angle between the tangent lines ranges from 150° to less than 180°, and
    wherein the discontinuous lens sections are regularly or randomly arranged in the pattern layer for implementing design images.

12. The process for manufacturing a decoration sheet of claim 11,
    wherein the pattern layer is formed by the steps of:
    changing a design to be implemented to a black and white image;
    inverting the black and white parts of the black and white image to produce an inverted image;
    programming a pattern processor to assign a lenticular lens to the black part of the inverted image and to assign a discontinuous lens section to the white part of the inverted image; and
    forming a pattern layer on the base layer by the pattern processor.

* * * * *